(12) United States Patent
Matsuo

(10) Patent No.: US 11,705,562 B2
(45) Date of Patent: Jul. 18, 2023

(54) FUEL CELL SYSTEM

(71) Applicant: TOYOTA JIDOSHA KABUSHIKI KAISHA, Toyota (JP)

(72) Inventor: Junichi Matsuo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/319,245

(22) Filed: May 13, 2021

(65) Prior Publication Data
US 2021/0367253 A1 Nov. 25, 2021

(30) Foreign Application Priority Data

May 22, 2020 (JP) .................................. 2020-089685

(51) Int. Cl.
*H01M 8/04537* (2016.01)
*H01M 16/00* (2006.01)

(52) U.S. Cl.
CPC ..... *H01M 8/04626* (2013.01); *H01M 16/006* (2013.01); *H01M 2220/20* (2013.01); *H01M 2250/20* (2013.01)

(58) Field of Classification Search
CPC ........... H01M 16/006; H01M 2220/20; H01M 2250/20
See application file for complete search history.

(56) References Cited

U.S. PATENT DOCUMENTS

| 2006/0272868 | A1 | 12/2006 | Fuse |
| 2009/0053566 | A1 | 2/2009 | Naganuma |
| 2016/0240904 | A1 | 8/2016 | Hoshi |
| 2017/0256806 | A1* | 9/2017 | Ogawa ................ H01M 8/0438 |

FOREIGN PATENT DOCUMENTS

| JP | 2001266917 A | 9/2001 |
| JP | 2005073475 A | 3/2005 |
| JP | 2007220425 A | 8/2007 |
| JP | 2011239639 A | 11/2011 |
| WO | 2015/053060 A1 | 4/2015 |

* cited by examiner

*Primary Examiner* — Adam A Arciero
(74) *Attorney, Agent, or Firm* — Dickinson Wright, PLLC

(57) ABSTRACT

A fuel cell system comprising: the fuel cell, the secondary cell and a controller, wherein, when a power generation pretreatment of the fuel cell is carried out, and when there is a request from the fuel cell to run the vehicle by output power of the secondary cell, the controller calculates discharge permission energy of the secondary cell, calculates a running permission delay request time from the discharge permission energy, which is a time necessary from the request to run the vehicle to the permission to run the vehicle, and measures a running permission delay time, which is a time that elapsed from the request to run the vehicle, and wherein, when the running permission delay request time value is smaller than the running permission delay time value, the controller permits the vehicle to run.

3 Claims, 4 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter may be referred to as cells). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer electrolyte membrane having proton ($H^+$) conductivity (hereinafter, it may be simply referred to as "electrolyte membrane"). Accordingly, the membrane electrode assembly may be referred to as "membrane electrode gas diffusion layer assembly" (MEGA).

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell system which is installed and used in a fuel cell vehicle (hereinafter may be simply referred to as "vehicle").

For example, Patent Literature 1 discloses such a fuel cell vehicle, that even when the fuel cell cannot generate power at the start-up of the vehicle, if the SOC of a battery is greater or equal to a predetermined value, the vehicle is run by a motor using the power of the battery.

Patent Literature 2 discloses a method for controlling a fuel cell vehicle that starts, during the start-up of a fuel cell, travelling only by the power charged to a secondary cell.

Patent Literature 3 discloses a fuel cell system that prevents a circulating pump from being activated, if a fuel cell is started up at low temperature.

Patent Literature 4 discloses a fuel cell system that makes a judgement on whether or not to start battery running, based on a difference between a remaining battery SOC and an SOC needed to start up a fuel cell.

Patent Literature 1: Japanese Patent Application Laid-Open (JP-A) No. 2001-266917
Patent Literature 2: JP-A No. 2005-073475,
Patent Literature 3: JP-A No. 2007-220425
Patent Literature 4: JP-A No. 2011-239639

For a secondary cell that permits a vehicle to run only by the power of the secondary cell during the start-up of a fuel cell, if the predetermined SOC value of the secondary cell is kept constant, there is a problem in that the power of the secondary cell cannot be effectively used, and it takes time to obtain vehicle running permission.

For example, even when the SOC is slightly below the predetermined value, the secondary cell has power to run the vehicle by itself. However, it takes time to obtain vehicle running permission when the fuel cell system is controlled so that, if the SOC of the secondary cell is below the predetermined value, vehicle running permission cannot be obtained until the fuel cell becomes able to generate power.

SUMMARY

The disclosed embodiments were achieved in light of the above circumstances. An object of the disclosed embodiments is to provide a fuel cell system configured to reduce the time to obtain vehicle running permission.

In a first embodiment, there is provided a fuel cell system installed in a vehicle configured to be run by power of a secondary cell when power generation of a fuel cell is impossible at start-up of the vehicle,
the system comprising:
the fuel cell,
the secondary cell and
a controller,
wherein, when a power generation pretreatment of the fuel cell is carried out, and when there is a request from the fuel cell to run the vehicle by output power of the secondary cell, the controller calculates discharge permission energy of the secondary cell, calculates a running permission delay request time from the discharge permission energy, which is a time necessary from the request to run the vehicle to the permission to run the vehicle, and measures a running permission delay time, which is a time that elapsed from the request to run the vehicle, and
wherein, when the running permission delay request time value is smaller than the running permission delay time value, the controller permits the vehicle to run.

When the power generation pretreatment of the fuel cell is carried out, and when the vehicle is run by the power of the secondary cell, the controller may limit vehicle request energy consumed by the vehicle, within a fuel cell start-up request time that is necessary until the fuel cell becomes able to generate power.

The time to start up the vehicle may be the time to start up the vehicle at freezing point.

The fuel cell system may further comprise a circulation pump configured to circulate fuel off-gas discharged from a fuel electrode of the fuel cell and return the fuel off-gas to the fuel cell, and the controller may stop driving of the circulation pump when the power of the secondary cell is equal to or less than a predetermined first threshold value and the vehicle request energy of the vehicle is equal to or more than a predetermined second threshold value during the time of running the vehicle by the power of the secondary cell and within the fuel cell start-up request time.

According to the fuel cell system of the disclosed embodiments, the time to obtain vehicle running permission is reduced.

BRIEF DESCRIPTION OF THE DRAWINGS

In the accompanying drawings.

DETAILED DESCRIPTION

Figure 1:
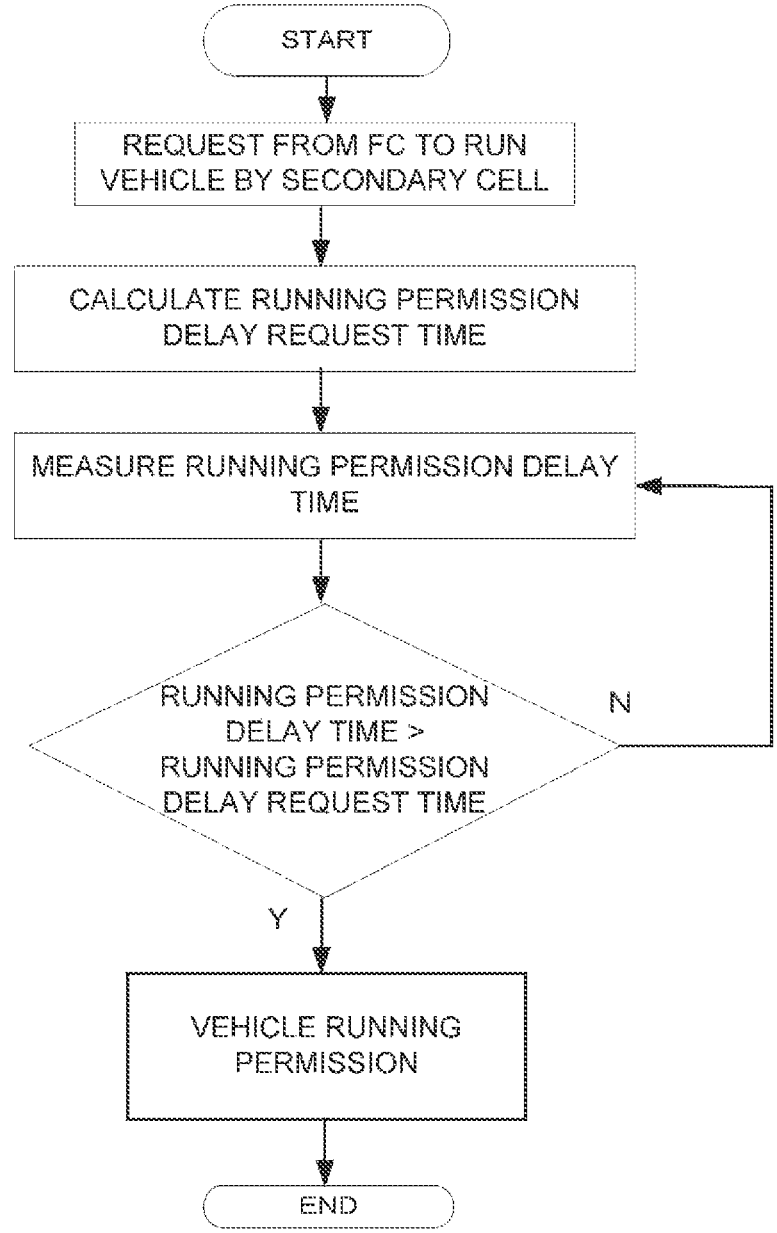
FIG. 1 is the flow chart of an example of the method for controlling the fuel cell system of the disclosed embodiments.

The fuel cell system of the disclosed embodiments is a fuel cell system installed in a vehicle configured to be run by power of a secondary cell when power generation of a fuel cell is impossible at start-up of the vehicle,
the system comprising:
the fuel cell,
the secondary cell and
a controller,
wherein, when a power generation pretreatment of the fuel cell is carried out, and when there is a request from the fuel cell to run the vehicle by output power of the secondary cell, the controller calculates discharge permission energy of the secondary cell, calculates a running permission delay request time from the discharge permission energy, which is a time necessary from the request to run the vehicle to the permission to run the vehicle, and measures a running permission delay time, which is a time that elapsed from the request to run the vehicle, and
wherein, when the running permission delay request time value is smaller than the running permission delay time value, the controller permits the vehicle to run.

At the start-up of the fuel cell vehicle, the start-up time may delay especially when the vehicle is started up at freezing point, from the viewpoint of protection of the components. At this time, if the power, SOC, remaining energy level and so on of the secondary cell are sufficient, it is possible to run the vehicle only by the secondary cell. Accordingly, it is possible to expedite vehicle running permission (Ready ON judgement). In the prior art, vehicle running permission is decided by whether or not the SOC of the secondary cell is equal to or more than a predetermined threshold value. However, when the SOC is less than the predetermined threshold value, generally, it is necessary to delay vehicle running permission until the fuel cell becomes able to generate power, and the merchantability of the vehicle may decrease.

When at least one of the unit cells of the fuel cell stack is frozen and shows partial blockage, if the fuel cell stack has low hydrogen concentration (high nitrogen concentration) at the time of start-up of the stack, there is a possibility that the hydrogen inside the unit cell is used up, and hydrogen shortage cause a decrease in the voltage of the unit cell and damage to the fuel cell.

Accordingly, chiefly at freezing point, the hydrogen concentration of the fuel electrodes of the stack is increased in advance (substitution of nitrogen in the anode with hydrogen) and such a power generation pretreatment (a warming up treatment) is carried out, that even if at least one unit cell is frozen, the total lack of hydrogen in the unit cell is prevented during the time the temperature of the inside of the stack increases to exceed freezing point. Since the power generation pretreatment takes time, the start of the power generation of the fuel cell stack is delayed.

In the disclosed embodiments, when the power generation pretreatment of the fuel cell is carried out, the duration for which the vehicle can be run only by the secondary cell, is calculated from the SOC, deterioration state and so on of the secondary cell. Moreover, the running permission delay request time that is necessary until the vehicle is permitted to run, is calculated from the difference between the duration for which the vehicle can be run only by the secondary cell and the fuel cell start-up request time that is necessary until the fuel cell becomes able to generate power. Accordingly, it is possible to minimize the running permission delay time between when there is the request to run the vehicle due to a shortage of the SOC of the secondary cell and when the vehicle is permitted to run.

According to the disclosed embodiments, the timing to permit the vehicle to run is determined considering, for example, the vehicle request energy and the discharge permission energy of the secondary cell, which is calculated from the SOC, deterioration state and so on of the secondary cell. Accordingly, the energy charged in the secondary cell is used when the discharge permission energy of the secondary cell is high, and it is possible to reduce the time between when there is the request to run the vehicle and when the vehicle is permitted to run.

The disclosed embodiments is highly effective not only at the time of normal start-up of the fuel cell, but also at the time of start-up of the fuel cell at freezing point.

The fuel cell system of the disclosed embodiments includes at least the fuel cell, the secondary cell and the controller.

The fuel cell system of the disclosed embodiments is installed and used in the vehicle that is configured to be run by the power of the secondary cell when the power generation of the fuel cell is impossible at the start-up of the vehicle.

In general, the fuel cell system of the disclosed embodiments is installed and used in a fuel cell vehicle that uses a motor as a driving source.

The motor is not particularly limited. It may be a conventionally-known drive motor.

The fuel cell may be a fuel cell stack composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode assembly including an oxidant electrode, an electrolyte membrane and a fuel electrode. As needed, it may include two separators sandwiching the membrane electrode assembly.

The separators may have a reaction gas flow path on a surface in contact with a gas diffusion layer. Also, on an opposite surface to the surface in contact with the gas diffusion layer, the separators may have a refrigerant flow path for keeping the fuel cell temperature at a constant level.

The separators may have supply and discharge holes for delivering the reaction gas and the refrigerant in the unit cell stacking direction.

As the supply hole, examples include, but are not limited to, a fuel gas supply hole, an oxidant gas supply hole and a refrigerant supply hole.

As the discharge hole, example include, but are not limited to, a fuel gas discharge hole, an oxidant gas discharge hole and a refrigerant discharge hole.

The separators may be a gas-impermeable, electroconductive member, etc. As the electroconductive member, examples include, but are not limited to, gas-impermeable dense carbon obtained by carbon densification, and a metal plate (such as an iron plate, an aluminum plate and a stainless-steel plate) obtained by press molding. The separators may have a current collection function.

The fuel cell stack may have a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by DuPont), for example.

The fuel cell system may include a reaction gas supplier for supplying reaction gas to the electrodes of the fuel cell.

The reaction gas supplier supplies reaction gas to the fuel cell stack.

The reaction gas encompasses fuel gas and oxidant gas.

As the reaction gas supplier, examples include, but are not limited to, a fuel gas supplier and an oxidant gas supplier. The fuel cell system may include any one of the suppliers, or it may include both of them.

The fuel cell system may include the fuel gas supplier for supplying fuel gas to the fuel electrode of the fuel cell.

The fuel gas is gas that mainly contains hydrogen. For example, it may be hydrogen gas.

As the fuel gas supplier, examples include, but are not limited to, a fuel tank such as a liquid hydrogen tank and a compressed hydrogen tank.

The fuel cell system may include a fuel gas supply flow path.

The fuel gas supply flow path connects the fuel cell to the fuel gas supplier and enables the supply of fuel gas from the fuel gas supplier to the fuel electrode of the fuel cell.

The fuel cell system may include a circulation flow path.

The circulation flow path enables that fuel off-gas discharged from the fuel electrode of the fuel cell is recovered and returned as circulation gas to the fuel electrode of the fuel cell.

The fuel off-gas contains the following, for example: fuel gas which passed through the fuel electrode while remaining unreacted, moisture which is water generated at the oxidant electrode and delivered to the fuel electrode, and oxidant gas which may be supplied to the fuel electrode during a purge.

As needed, the circulation flow path of the fuel cell system may be provided with an ejector, a circulation pump for controlling the flow rate of the circulation gas (such as a hydrogen pump), etc.

The circulation pump may be electrically connected to the controller, and the flow rate of the circulation gas may be controlled by controlling the turning on/off, rotational frequency, etc., of the circulation pump by the controller.

The ejector is disposed at the junction of the fuel gas supply flow path and the circulation flow path, for example. It supplies mixed gas containing the fuel gas and the circulation gas to the fuel electrode of the fuel cell. As the ejector, a conventionally-known ejector may be used.

The circulation flow path may be provided with a gas-liquid separator for reducing the moisture in the fuel off-gas. Also, the circulation flow path may be provided with a water discharge flow path that branches from the circulation flow path by the gas-liquid separator. The water discharge flow path may be provided with a water discharge valve.

The moisture separated from the fuel off-gas in the gas-liquid separator may be discharged by opening the water discharge valve of the water discharge flow path branching from the circulation flow path.

The water discharge valve may be electrically connected to the controller, and the amount of discharged liquid water may be controlled by controlling the opening and closing of the water discharge valve by the controller.

The fuel cell system may include a fuel off-gas discharger.

The fuel off-gas discharger enables the discharge of the fuel off-gas to the outside (the outside of the system). The outside may be the outside of the fuel cell system, or it may be the outside of the vehicle.

The fuel off-gas discharger may include a fuel off-gas discharge valve. As needed, it may further include a fuel off-gas discharge flow path.

The fuel off-gas discharge valve may be electrically connected to the controller, and the fuel off-gas discharge flow amount may be controlled by controlling the opening and closing of the fuel off-gas discharge valve by the controller.

The fuel off-gas discharge flow path may branch from the circulation flow path, for example. It enables the discharge of the fuel off-gas to the outside when the concentration of hydrogen in the fuel off-gas is too low.

The fuel cell system may include the oxidant gas supplier, an oxidant gas supply flow path, and an oxidant gas discharge flow path.

The oxidant gas supplier supplies oxidant gas to at least the oxidant electrode of the fuel cell.

As the oxidant gas supplier, for example, an air compressor may be used. The air compressor is driven by a control signal from the controller and introduces the oxidant gas to the cathode side (such as the oxidant electrode and the cathode inlet manifold) of the fuel cell.

The oxidant gas supply flow path connects the oxidant gas supplier to the fuel cell and enables the supply of oxidant gas from the oxidant gas supplier to the oxidant electrode of the fuel cell.

The oxidant gas is oxygen-containing gas. It may be air, dry air, pure oxygen or the like.

The oxidant gas discharge flow path enables the discharge of the oxidant gas from the oxidant electrode of the fuel cell.

The oxidant gas discharge flow path may be provided with an oxidant gas pressure control valve.

The oxidant gas pressure control valve is electrically connected to the controller. By opening the oxidant gas pressure control valve by the controller, reacted cathode off-gas is discharged from the oxidant gas discharge flow path. By controlling the opening degree of the oxidant gas pressure control valve, the pressure of the oxidant gas supplied to the oxidant electrode (cathode pressure) can be controlled.

The oxidant gas supply flow path may be provided with an intercooler. The intercooler is connected to a refrigerant circulation flow path to exchange heat with the refrigerant and cool down the oxidant gas discharged from the oxidant gas supplier. When there is a request to warm up the fuel cell (the power generation pretreatment), the oxidant gas is compressed by the oxidant gas supplier to increase the temperature thereof, and the temperature of the refrigerant is increased by the heat of the oxidant gas.

The fuel cell system may include a bypass flow path which branches from the oxidant gas supply flow path at the downstream side of the intercooler, bypasses the fuel cell, and then is connected to the oxidant gas discharge flow path. The bypass flow path is provided with a bypass valve for controlling the opening state of the bypass flow path. The bypass valve is electrically connected to the controller, and it is opened by the controller when the power of the secondary cell is consumed by driving the oxidant gas supplier in the state where, for example, the charge capacity of the secondary cell is not sufficient at the time of regenerative power generation by the drive motor. Accordingly, the oxidant gas is discharged into the oxidant gas discharge flow path and is not delivered to the fuel cell.

The fuel gas supply flow path and the oxidant gas supply flow path may be connected via a joining flow path. The joining flow path may be provided with a purge valve.

The purge valve may be electrically connected to the controller, and by opening the purge valve by the controller, the oxidant gas in the oxidant gas supplier may be allowed to flow into the fuel gas supply flow path as purge gas.

The purge gas is used for purging, and it may be reaction gas. The reaction gas may be fuel gas, oxidant gas or mixed reaction gas containing them.

The fuel cell system may include a refrigerant supplier and a refrigerant circulation flow path as the cooling system of the fuel cell.

The refrigerant circulation flow path communicates between the refrigerant supply hole and refrigerant discharge hole installed in the fuel cell, circulates the refrigerant supplied from the refrigerant supplier in and out of the fuel cell, and enables the cooling of the fuel cell.

As the refrigerant supplier, examples include, but are not limited to, a cooling water pump.

The refrigerant circulation flow path maybe provided with a radiator for heat dissipation from cooling water.

As the cooling water (refrigerant), for example, a mixed solution of ethylene glycol and water may be used to prevent freezing at low temperature.

The fuel cell system may include the secondary cell.

The secondary cell (battery) needs to be a chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier such as the air compressor, etc. The secondary cell may be chargeable by a power source outside the vehicle, such as a household power source. The secondary cell may be charged by the output power of the fuel cell.

The fuel cell system may include an auxiliary instrument that uses a battery as a power source.

As the auxiliary instrument, examples include, but are not limited to, a lighting instrument for vehicles.

Also, a charge state sensor for detecting the remaining capacity of the secondary cell, may be installed in the fuel cell system of the disclosed embodiments. The charge state sensor detects the state-of-charge (SOC) value of the secondary cell. The charge state sensor may be connected to the controller. The controller may be configured to detect the state-of-charge value of the secondary cell by the output of the charge state sensor.

The controller may manage the state-of-charge value of the secondary cell and may control the charge and discharge of the secondary cell.

The state of charge (SOC) value means the percentage of the charge capacity with respect to the full charge capacity of the secondary cell. The full charge capacity is a SOC of 100%.

The controller controls the gas flow rate of the reaction gas.

The controller may be connected to the gas-liquid separator, the water discharge valve, the fuel off-gas discharge valve, the oxidant gas pressure control valve, the purge valve, the fuel gas supplier, the oxidant gas supplier, the bypass valve, the secondary cell, the circulation pump and so on through an input-output interface. Also, the controller may be electrically connected to the ignition switch that may be installed in the vehicle.

The controller physically includes a processing unit such as a central processing unit (CPU), a memory device such as a read-only memory (ROM) and a random access memory (RAM), and the input-output interface, for example. The ROM is used to store a control program, control data and so on processed by the CPU, and the RAM is mainly used as various workspaces for control processes. Also, the controller may be a control device such as an engine control unit (ECU).

1. First Embodiment

According to the first embodiment, a decrease in the running performance of the vehicle is avoided by calculating the amount of the discharge permission energy of the secondary cell from the SOC, deterioration state and so on of the secondary cell, and then extending the running permission delay time.

FIG. 1 is the flow chart of an example of the method for controlling the fuel cell system of the disclosed embodiments. The disclosed embodiments are not limited to this typical example.

When the power generation pretreatment of the fuel cell is carried out, and when there is the request from the fuel cell to run the vehicle by the output power of the secondary cell, the controller calculates the discharge permission energy of the secondary cell, calculates the running permission delay request time from the discharge permission energy, which is a time necessary from the request to run the vehicle to the permission to run the vehicle, and measures the running permission delay time, which is a time that elapsed from the request to run the vehicle. When the running permission delay request time value is smaller than the running permission delay time value, the controller permits the vehicle to run.

The request from the fuel cell to run the vehicle by the output power of the secondary cell, may be made in the following case, for example: the controller checks the start-up temperature of the fuel cell, the presence or absence of a frozen component in the fuel cell system, the presence or absence of a failed component in the fuel cell system, etc., and the controller determines that the fuel cell can output a certain level or more of power within a specified time. This is because, if the output power of the fuel cell is not secured after running the vehicle by the secondary cell, the running performance of the vehicle may decrease. Accordingly, when the fuel cell cannot output the certain level or more of power within the specified time, the request from the fuel cell to run the vehicle by the output power of the secondary cell, is not made.

The temperature of the fuel cell may be measured by, for example, installing a temperature sensor in the fuel cell system and measuring the fuel cell temperature with the temperature sensor. The temperature sensor may be electrically connected to the controller, and the controller may detect the temperature output from the temperature sensor. The temperature of the fuel cell may be the temperature of the cooling water.

The presence or absence of a frozen component may be checked by, for example, installing a temperature sensor in the fuel cell system, measuring the temperature of each component with the temperature sensor, and determining the component as a frozen component if the temperature is equal to or less than freezing point.

The presence or absence of a failed component may be checked by, for example, installing a resistance sensor in the fuel cell system, measuring the resistance of each component with the resistance sensor, determining the component as a failed component if the resistance is equal to or more than a predetermined value.

The controller calculates the discharge permission energy of the secondary cell.

The discharge permission energy (dischargeable energy) of the secondary cell may be appropriately determined by considering the vehicle request energy and so on from the SOC, deterioration state and so on of the secondary cell.

In addition, the discharge permission energy of the secondary cell may be determined by considering such a lower limit of the SOC of the secondary cell, that prevents the secondary cell from over-discharging.

The discharge permission energy (kJ) of the secondary cell may be calculated by the following formula (A), for example.

Discharge permission energy of the secondary cell=
(SOC of the secondary cell at the time of start-up of the vehicle−Target SOC of the secondary cell at the time of completion of the running of the vehicle by the secondary cell)/100×Theoretical full charge energy (kJ) of the secondary cell×Deterioration factor of the secondary cell    Formula (A)

The target SOC of the secondary cell at the time of completion of the running of the vehicle by the secondary cell, means the SOC of the secondary cell at the time of completion of the power generation pretreatment of the fuel cell in the case of running the vehicle only by the power of the secondary cell since the start of the power generation pretreatment of the fuel cell.

The deterioration factor of the secondary cell can be calculated from, for example, the ratio of the current, actual-measured full charge energy of the secondary cell to the theoretical full charge energy of the secondary cell, considering the total number of times of charging and discharging the secondary cell, etc.

The controller calculates the running permission delay request time from the discharge permission energy of the secondary cell, which is a time necessary from the request to run the vehicle to the permission to run the vehicle.

The running permission delay request time (ready delay time) may be calculated by the following formula (B), for example.

Running permission delay request time (sec)=(Vehicle running request time (sec) by the secondary cell×Power (kW) used to run the vehicle by the secondary cell−Discharge permission energy (kJ) of the secondary cell)/Power (kW) used to run the vehicle by the secondary cell    Formula (B)

The power (kW) used to run the vehicle by the secondary cell, can be estimated by considering the power consumption of the drive motor used to run the vehicle, the power consumption of an air-conditioning instrument (e.g., air conditioner) and the power consumption of the auxiliary instrument, for example.

The controller measures the running permission delay time, which is a time that elapsed from the request to run the vehicle.

The running permission delay time may be obtained by, for example, installing a time measurement instrument in the fuel cell system and measuring the time elapsed from the request to run the vehicle with the time measurement instrument. The time measurement instrument may be electrically connected to the controller, and the controller may detect the running permission delay time output from the time measurement instrument.

When the running permission delay request time value is smaller than the running permission delay time value, the controller permits the vehicle to run. For example, if the running permission delay request time value is 10 seconds, the controller permits the vehicle to run, at the time when the running permission delay time value exceeds 10 seconds. In other words, the controller does not permit the vehicle to run until the running permission delay time exceeds 10 seconds. That is, when the running permission delay request time value is 10 seconds, the controller does not permit the vehicle to run for 10 seconds and forces the vehicle to wait. Accordingly, it is possible to suppress that the power of the secondary cell becomes insufficient and the vehicle is stopped while the vehicle is run only by the power of the secondary cell during the power generation pretreatment of the fuel cell.

2. Second Embodiment

It takes a certain time until the fuel cell becomes able to generate power (until the fuel cell starts up). Accordingly, when the dischargeable power of the fuel cell is large, there is the following possibility: large energy of the secondary cell is consumed until the fuel cell starts power generation, and the SOC of the secondary cell is depleted, whereby the output power of the secondary cell is decreased and, at the end, the power for running the vehicle by the secondary cell may be insufficient.

To prevent a shortage of the power used to run the vehicle, without suppressing the output power of the secondary cell until the power generation of the fuel cell starts, it is necessary to delay the time between when there is the request to run the vehicle and when the vehicle is permitted to run. Accordingly, the commercial value of the vehicle is decreased. In addition, as the dischargeable power of the secondary cell increases, it is necessary to increase the setup value of the SOC of the secondary cell, which is necessary for running permission. Accordingly, the commercial value of the vehicle is further decreased. The reason is as follows. Since the relationship between the power, time and energy is represented by the following formula: power (kW)×time (sec)=energy (kJ), when power is consumed for the same period of time both in the cases of large power and small power, consumption energy is larger in the case of large power.

According to the disclosed embodiments, by suppressing the output power of the secondary cell until the fuel cell starts power generation, and by suppressing the energy consumption of the secondary cell, the output power of the secondary cell is kept at a certain level or more until the fuel cell starts power generation.

Figure 2:
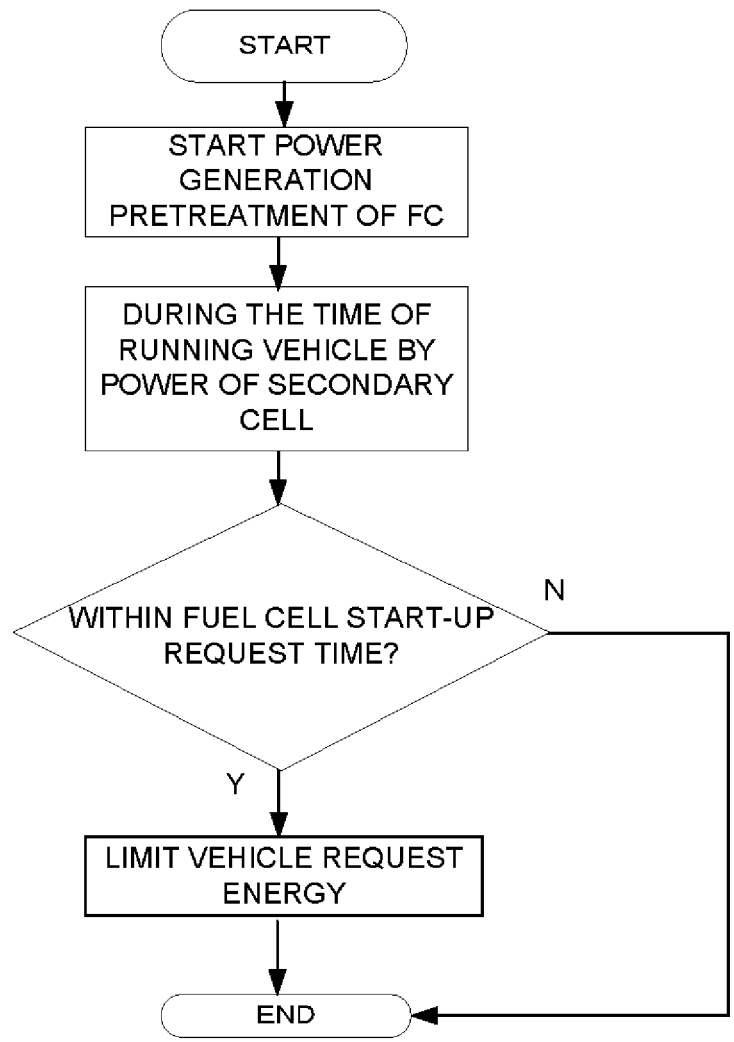
FIG. 2 is the flow chart of another example of the method for controlling the fuel cell system of the disclosed embodiments.

FIG. 2 is the flow chart of another example of the method for controlling the fuel cell system of the disclosed embodiments.

When the power generation pretreatment of the fuel cell is carried out, and when the vehicle is run by the power of the secondary cell, the controller limits the vehicle request energy consumed by the vehicle, within a fuel cell start-up request time that is necessary until the fuel cell becomes able to generate power.

On the other hand, after the fuel cell start-up request time elapsed, the controller ends the control without limiting the vehicle request energy.

Figure 3:
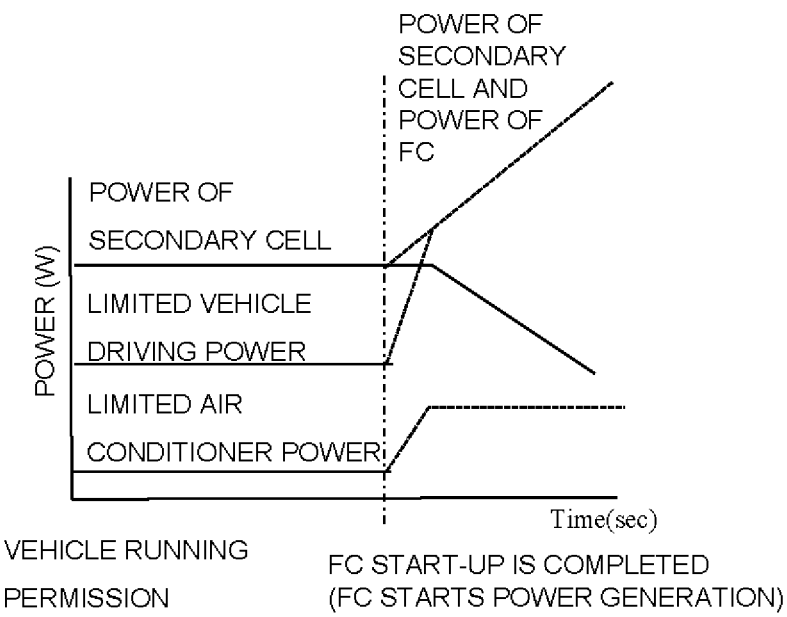
FIG. 3 is a view showing an example of the relationship between the power and the time between when vehicle running permission by the power of the secondary cell is obtained and when the FC power generation pretreatment is completed (FC start-up is completed) and the fuel cell starts power generation.

FIG. 3 is a view showing an example of the relationship between the power and the time between when vehicle running permission by the power of the secondary cell is obtained and when the FC power generation pretreatment is completed (FC start-up is completed) and the fuel cell starts power generation.

As shown in FIG. 3, until the FC start-up is completed, the vehicle request energy such as vehicle running energy and air conditioner consumption energy may be limited by limiting the vehicle driving power, the air conditioner power and so on.

When the power generation pretreatment of the fuel cell is carried out and when the vehicle is run by the power of the secondary cell, the upper limit of the energy requested by the vehicle (the vehicle request energy) is determined to ensure the time of running the vehicle only by the power of the secondary cell until the completion of the power generation pretreatment of the fuel cell (until the start of the power generation of the fuel cell).

The fuel cell start-up request time that is necessary until the fuel cell becomes able to generate power, varies depending on the temperature of the fuel cell, the size of the fuel cell, the number of the unit cells included in the stack, etc. Accordingly, the fuel cell start-up request time may be measured in advance by an experiment or the like and memorized in the controller.

As the vehicle request energy, examples include, but are not limited to, the consumption energy of the drive motor for running the vehicle, the consumption energy of the air-conditioning instrument, and the consumption energy the auxiliary instrument.

For the limitation of the vehicle request energy, from the viewpoint of suppressing that the SOC of the secondary cell is depleted and the vehicle is stopped before the fuel cell becomes able to generate power, the upper limit of the vehicle request energy may be determined so that, for example, the energy consumed by the secondary cell until the fuel cell becomes able to generate power, is equal to or less than the discharge permission energy of the secondary cell. More specifically, the energy consumed by the secondary cell during the time of running the vehicle may be decreased by lowering the upper limit of the running speed of the vehicle, limiting the upper and lower limits of the preset temperature of the air conditioner, etc.

3. Third Embodiment

When, by any factor, the output power of the secondary cell is decreased to a certain value or less during the power generation pretreatment of the fuel cell and during the time of running the vehicle by the power of the secondary cell, if the fuel cell continues the power generation pretreatment and cannot generate power, there is a possibility that the running performance of the vehicle decreases and the vehicle becomes unable to run.

According to the disclosed embodiments, when, by any factor, the output power of the secondary cell is decreased to the predetermined first threshold value or less during the power generation pretreatment of the fuel cell and during the time of running the vehicle by the power of the secondary cell, and when the vehicle request energy is equal to or more than the predetermined second threshold value due to the request to run the vehicle, the driving of the circulation pump is stopped to terminate the power generation pretreatment of the fuel cell (for example, substitution of nitrogen with hydrogen) in the middle, thereby expediting the power generation of the fuel cell. In this case, to ensure the desired output power of the fuel cell to suppress insufficient power generation (negative voltage) of the fuel cell, the driving of the circulation pump is stopped, and the power generation of the fuel cell is started, whereby the startability of the fuel cell is ensured.

A circulation pump non-circulating operation, in which the driving of the circulation pump is suspended and the power generation of the fuel cell is carried out, may be carried out for the purpose of increasing the startability (especially freezing point startability) of the fuel cell when substitution of inert gas such as nitrogen in the fuel electrode with fuel gas such as hydrogen (an anode fuel gas concentration increasing treatment) is not possible for any factor, or when the substitution takes longer time than specified.

More specifically, the circulation pump non-circulating operation means that the fuel off-gas discharged from the fuel electrode of the fuel cell is discharged to the outside of the system, without circulating the gas, and the fuel cell is caused to generate power only by the fuel gas supplied from the fuel gas supplier. Accordingly, the fuel cell system for the execution of the circulation pump non-circulating operation substantially include the fuel gas supplier and the fuel off-gas discharger.

Due to the circulation pump non-circulating operation of the fuel cell, even if the inside of at least one unit cell is frozen, an increase in nitrogen concentration is less likely to occur in the unit cell. Accordingly, a required amount of fuel gas can be kept supplied to the inside of the unit cell. However, as a tradeoff of not rotating the circulation pump, the fuel gas flow rate of the fuel electrode decreases. Accordingly, it becomes difficult to supply the fuel gas to fine pores inside the at least one unit cell and to the unit cells disposed away from the anode inlet manifold of the stack, etc., and a fuel gas insufficient site may occur locally in the fuel cell and deteriorate the fuel cell. Accordingly, the frequency of execution of the circulation pump non-circulating operation may be set to minimum.

Figure 4:
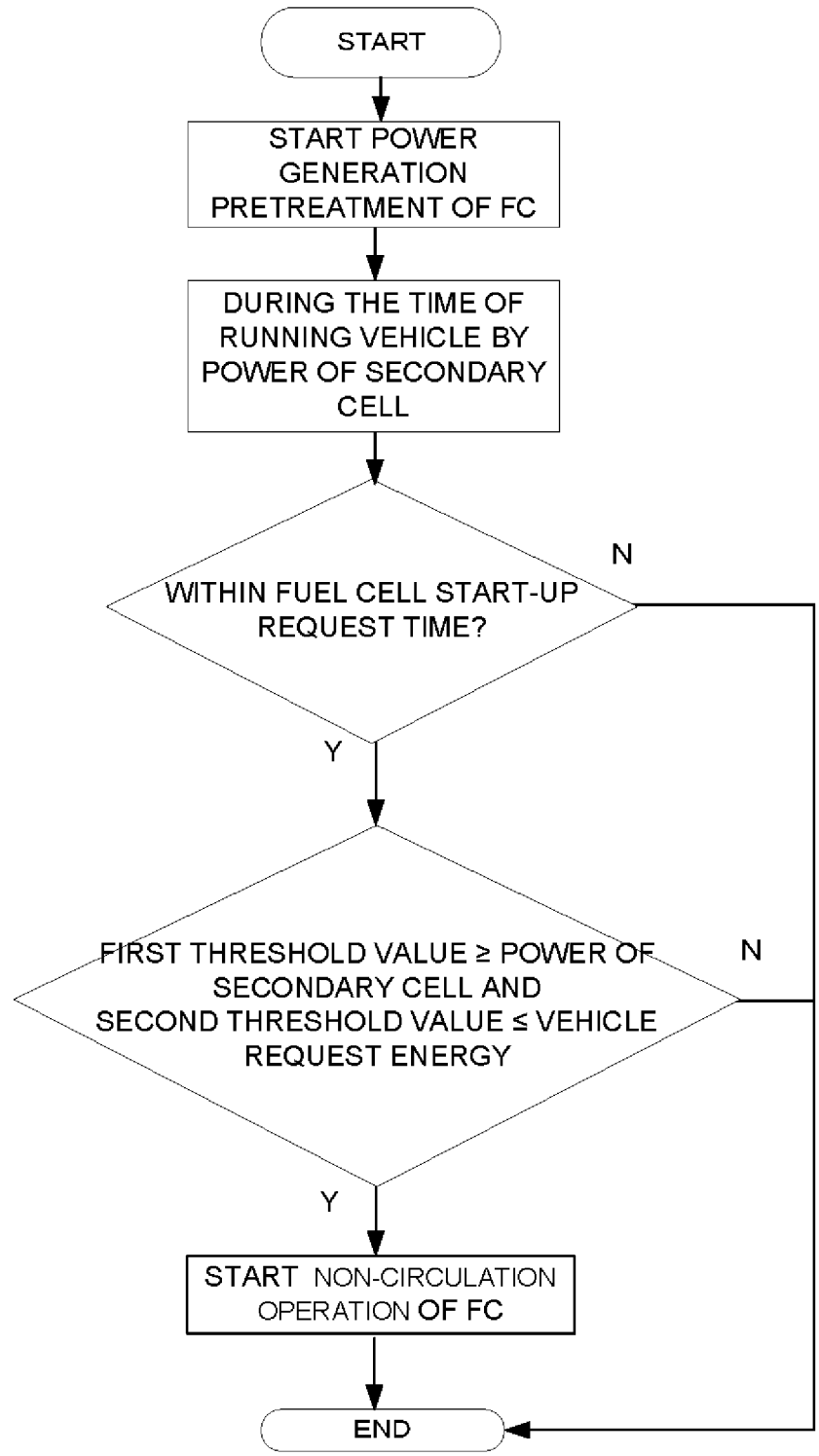
FIG. 4 is the flow chart of another example of the method for controlling the fuel cell system of the disclosed embodiments.

FIG. 4 is the flow chart of another example of the method for controlling the fuel cell system of the disclosed embodiments.

The fuel cell system of the disclosed embodiments further includes the circulation pump configured to circulate the fuel off-gas discharged from the fuel electrode of the fuel cell and return the fuel off-gas to the fuel cell. The controller stops the driving of the circulation pump when the power of the secondary cell is equal to or less than the predetermined first threshold value and the vehicle request energy of the vehicle is equal to or more than the predetermined second threshold value during the time of running the vehicle by the power of the secondary cell and within the fuel cell start-up request time.

When, after the fuel cell start-up request time elapsed, the power of the secondary cell is less than the predetermined first threshold value or the vehicle request energy is less than the predetermined second threshold value, the controller ends the control without stopping the driving of the circulation pump.

The first threshold value is not particularly limited, as long as it is such a power (output power) of the secondary cell, that does not make the vehicle impossible to run. For example, the first threshold value may be the power of the secondary cell just before the running of the vehicle is disrupted, and it may be appropriately determined depending on the running performance of the vehicle, etc.

For example, the second threshold value may be equal to or less than the running permission energy of the secondary cell so as not to make the vehicle impossible to run. The second threshold value may be appropriately determined depending on the running performance of the vehicle, etc.

Figure 5:
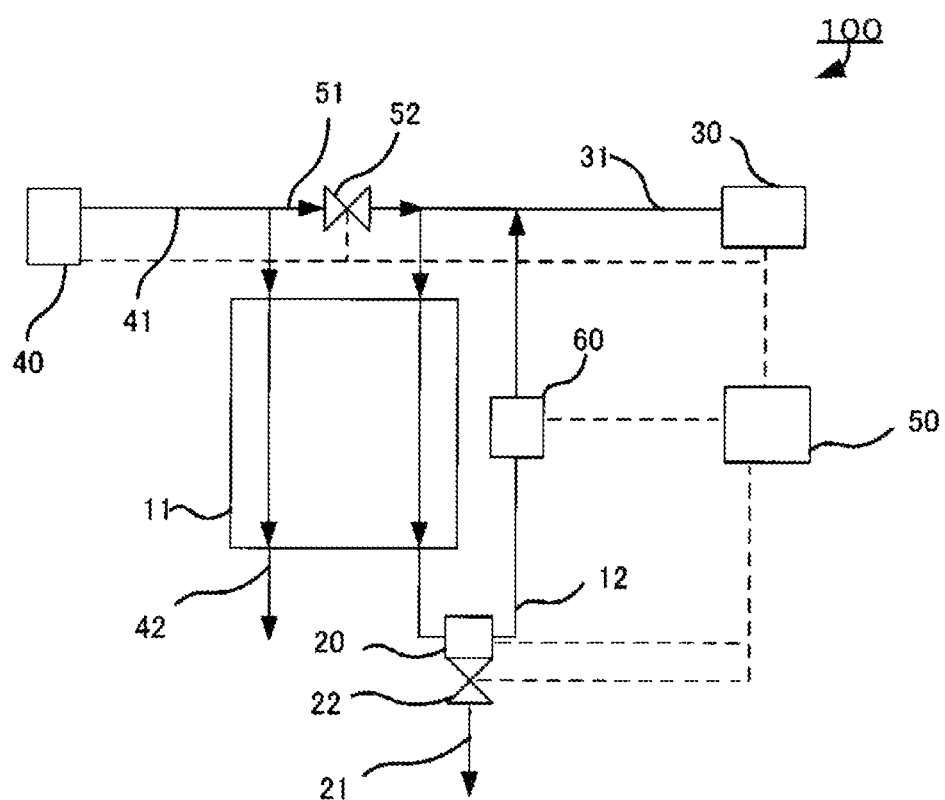
FIG. 5 is a schematic configuration diagram of an example of the fuel cell system of the disclosed embodiments.

FIG. 5 is a schematic configuration diagram of an example of the fuel cell system of the disclosed embodiments. The fuel cell system of the disclosed embodiments is not limited to this example.

A fuel cell system 100 shown in FIG. 5 includes a fuel cell 11, a circulation flow path 12, a gas-liquid separator 20, a water discharge flow path 21, a water discharge valve 22, a fuel gas supplier 30, a fuel gas supply flow path 31, an oxidant gas supplier 40, an oxidant gas supply flow path 41, an oxidant gas discharge flow path 42, a controller 50, a joining flow path 51, a purge valve 52 and a circulation pump 60. It further includes a secondary cell (not shown).

The gas-liquid separator 20, the water discharge valve 22, the fuel gas supplier 30, the oxidant gas supplier 40, the purge valve 52, the circulation pump 60 and the secondary cell (not shown) are electrically connected to the controller 50, and they are controlled by the controller 50.

REFERENCE SIGNS LIST

11. Fuel cell
12. Circulation flow path
20. Gas-liquid separator
21. Water discharge flow path
22. Water discharge valve
30. Fuel gas supplier
31. Fuel gas supply flow path
40. Oxidant gas supplier
41. Oxidant gas supply flow path
42. Oxidant gas discharge flow path
50. Controller
51. Joining flow path
52. Purge valve
60. Circulation pump
100. Fuel cell system

The invention claimed is:

1. A fuel cell system installed in a vehicle configured to be run by power of a secondary cell when power generation of a fuel cell is impossible at start-up of the vehicle,
the system comprising:
the fuel cell,
the secondary cell,
a fuel gas supplier,
a fuel off-gas discharger,
a circulation pump configured to circulate fuel off-gas discharged from a fuel electrode of the fuel cell and return the fuel off-gas to the fuel cell, and
a controller,
wherein, when a power generation pretreatment of the fuel cell is carried out, and when there is a request from the fuel cell to run the vehicle by output power of the secondary cell, the controller calculates discharge permission energy of the secondary cell, calculates a running permission delay request time from the discharge permission energy, which is a time necessary from the request to run the vehicle to the permission to run the vehicle, and measures a running permission delay time, which is a time that elapsed from the request to run the vehicle,
wherein, when the running permission delay request time value is smaller than the running permission delay time value, the controller permits the vehicle to run;
wherein, when the power generation pretreatment of the fuel cell is carried out, and when the vehicle is run by the power of the secondary cell, the controller limits vehicle request energy consumed by the vehicle, within a fuel cell start-up request time that is necessary until the fuel cell becomes able to generate power;
wherein the time to start up the vehicle is the time to start up the vehicle at freezing point; and
wherein the controller stops driving of the circulation pump when the power of the secondary cell is equal to or less than a predetermined first threshold value and the vehicle request energy of the vehicle is equal to or more than a predetermined second threshold value during the time of running the vehicle by the power of the secondary cell and within the fuel cell start-up request time.

2. The fuel cell system according to claim 1, wherein the running permission delay request time value is 10 seconds.

3. The fuel cell system according to claim 1, the system further comprising:
   a fuel gas supply flow path,
   an oxidant gas supply flow path,
   a joining flow path, and
   a purge valve,
   wherein the fuel gas supply flow path and the oxidant gas supply flow path are connected via the joining path, and
   wherein the joining flow path is provided with the purge valve.

\* \* \* \* \*